Oct. 21, 1924.

W. T. SOULIS 1,512,718

INTERNAL COMBUSTION ENGINE

Filed May 23, 1919      3 Sheets-Sheet 1

INVENTOR
William T. Soulis
BY
P. Frank Jones
ATTORNEY.

Oct. 21, 1924.

W. T. SOULIS

INTERNAL COMBUSTION ENGINE

Filed May 23, 1919

INVENTOR
William T. Soulis
BY
P. Frank Jones
ATTORNEY.

Oct. 21, 1924.

W. T. SOULIS 1,512,718

INTERNAL COMBUSTION ENGINE

Filed May 23, 1919     3 Sheets-Sheet 3

INVENTOR
Wilbur T. Soulis
BY
P. Frank Jones
ATTORNEY.

Patented Oct. 21, 1924.

1,512,718

UNITED STATES PATENT OFFICE.

WILBUR T. SOULIS, OF NEW YORK, N. Y.

INTERNAL-COMBUSTION ENGINE.

Application filed May 23, 1919. Serial No. 299,310.

*To all whom it may concern:*

Be it known that I, WILBUR T. SOULIS, a citizen of the United States, residing in the borough of Manhattan, city, county, and State of New York, have invented certain new and useful Improvements in Internal-Combustion Engines, of which the following is a specification.

The present invention relates generally to internal combustion engines and is more particularly directed to improvements in pistons and the method of constructing the same, whereby the efficiency of internal combustion engines in which my invention is embodied will be materially increased.

As is well known, the weight of the cast iron pistons now generally employed in internal combustion engines has long been recognized by automotive engineers as a serious factor in retarding the development of high speed engines of that type. In the functioning of the cast iron pistons, considerable power must necessarily be consumed in overcoming their inertia for the amount of fuel consumed. Furthermore, the weight of the piston causes unnecessary vibration and naturally increases the wear on the cooperating parts of the engine structure. Various attempts have been made to overcome these and those disadvantages which reside in the use of cast iron pistons, by producing pistons of steel, or a cast metal such as aluminum or an aluminum alloy. These efforts, however, have been mainly unsuccessful from a practical viewpoint, owing to the difficulties involved in production and in obtaining a structure possessing the proper coefficient of expansion relatively to the wall of the engine cylinder, to obtain the maximum engine performance under varying loads and conditions of operation.

The general object of this invention, therefore, is to increase the efficiency of internal combustion engines by reducing the weight and vibration and the wear incident thereto on the cooperating parts, obtaining increased power and speed, reducing the fuel consumption and securing a greater range of flexibility of operation.

More specifically, the object of this invention is to provide a piston for internal combustion engines and a method of constructing the same whereby the general objects above set forth may be attained.

A further object of my invention resides in the provision of a piston for internal combustion engines by the practicing of my method of construction, which is formed or built up of two metals possessing different characteristics, such, for instance, as steel and cast iron or a ferrous metal, wherein the advantages inherent to each metal may be utilized for the production of a composite structure possessing qualities which could not be obtained by the use of one or the other of said metals separately.

My invention also contemplates a piston as heretofore described which may be made up of steel and cast iron, or similarly hard and soft metals, in which the parts of the piston formed of the different metals are so united that a homogeneous structure will be provided which will possess all of the advantages of a piston of a single casting or other integral structure without its disadvantages.

This invention further comprehends a method of producing a piston whereby the structure may be economically manufactured, the finished product possessing greater strength and durability than pistons of the conventional types. Furthermore, the pistons made by the practicing of my invention will be lighter in weight than the cast iron pistons so that the wear or scoring of the cylinder walls resulting from their use will be substantially eliminated or reduced to a minimum.

Other objects and advantages of the employment of my invention will become obvious as the description proceeds, and I would have it understood that I reserve unto myself the full range of equivalents in structure and uses, to which I may be entitled under my invention in its broadest aspect.

I shall now proceed to describe my invention with reference to the accompanying drawings, wherein I have illustrated certain preferred embodiments for the purpose of presenting a clear and comprehensive disclosure, it being obvious that my invention is susceptible of taking other forms without departing from the scope and spirit thereof.

Figure 2:
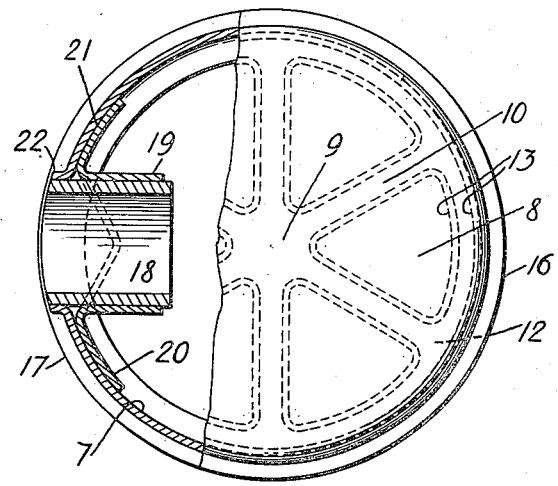
Fig. 2 is a plan view, partly in section, of the structure shown in Fig. 1.

Referring now to the drawings in detail in which like characters of reference are employed to designate similar parts throughout the several views, 7 indicates the piston body consisting of a relatively light thin-walled cylindrical shell of pressed metal, preferably steel, this metal possessing the desired strength and resistivity and being capable of being pressed and drawn up into the requisite shape. The compressing and drawing operations which may be performed in any well known manner, materially toughen and strengthen the steel shell and therefore render it possible to use comparatively light gauge material, which is especially advantageous in carrying out the general objects of my invention.

The shell 7 is preferably formed with an inwardly directed flange 7ª surrounding the lower end of the skirt portion and an integral head 8 which may be flat, concave, convex or otherwise shaped to meet special engine requirements, and which may be reinforced by a member, such as shown in Figs. 1 to 6 inclusive, made of pressed steel or other suitable metal. This reinforcement is preferably of a spider conformation, and consists of a body portion 9 having radial arms or extensions 10, the edges of the latter being flanged downwardly as indicated at 11 to strengthen and add rigidity to the member. In some instances, where greater strength may be desirable, the outer ends of the arms 10 of the reinforcing member may be connected by an annulus 12 preferably formed integral therewith, the edges of this annulus being flanged at 13 similarly to the arms or extensions 10, as shown in dotted lines in Fig. 2.

The reinforcing member 9, it will be noted in the present showing is positioned within the shell 7 so that the flat or upper surfaces of the radial arms 10 bear against the underside of the head portion and closely contact therewith throughout their entire areas, the downwardly depending flanges 11 at the ends of the arms contacting with the adjacent portions of the inner wall of the shell. Where the form of reinforcing member embodying the annulus is used, the entire outer face of the depending flange 13 thereof will lie in contact with the shell inner wall.

It is manifest that in some instances of construction it may be desirable to modify the shape of the head reinforcement, which, for example may be made in the form of an annular plate provided with a rim or flange, the surface of the plate bearing against the underside of the piston head and having strengthening ribs or projecting portions of substantially the same depth as the flange lying in the same plane therewith, or, the reinforcing member, such as shown in Figs. 3 to 6, may be inverted so that the edges of the flange 11 will lie in contact with the underside of the piston head. In any of the structures just described, it will be observed that the portions of the reinforcing member abutting against the piston head and the adjacent part of the wall of the piston will materially strengthen the piston at the point where the greatest stress is imposed upon it by the explosive pressure in the functioning of the engine. Furthermore, the reinforcement by reason of its construction or formation and the material employed, serves as a most efficient medium for effecting the dissipation of the heat from the piston head and the adjacent part of the piston wall, thereby materially adding to the durability and efficiency of operation of the piston.

Figure 1:
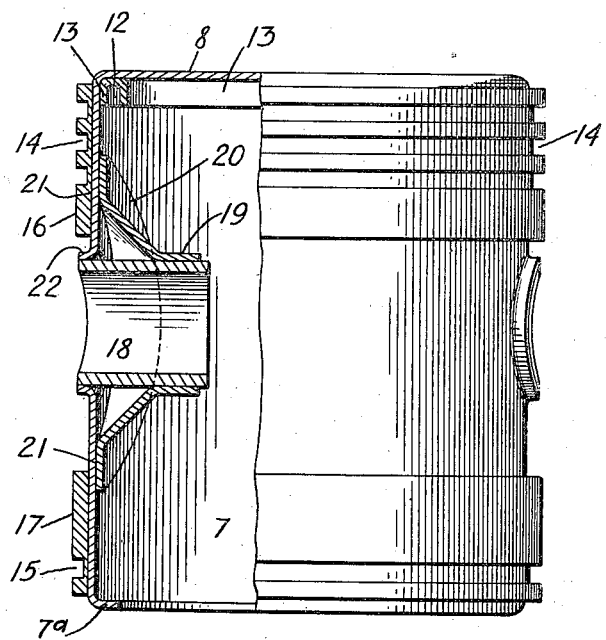
Fig. 1 is an elevation, partly in section, of a practical form of my invention embodying a pressed steel shell with cast iron bearing and reinforcing rings united thereto.
Figure 3:
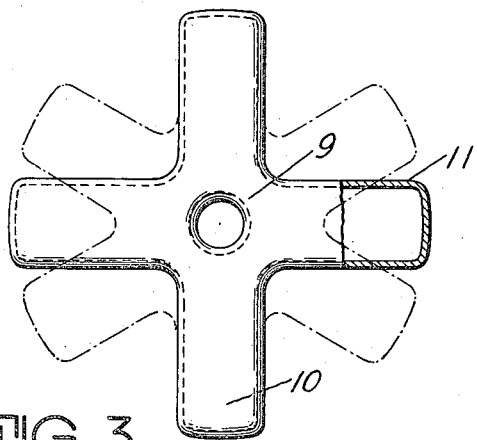
Fig. 3 is a top plan view of one form of reinforcing member for the piston head.
Figure 4:
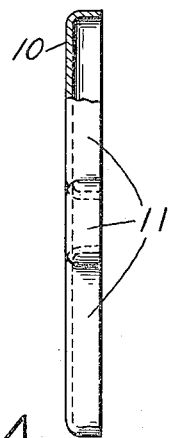
Fig. 4 is a side view of the member shown in Fig. 3.
Figure 5:
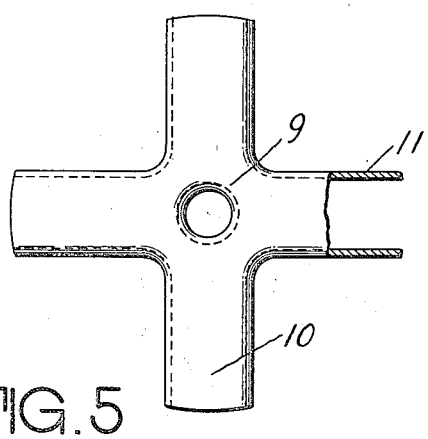
Figs. 5 and 6 are modified forms of the reinforcement shown in Fig. 3.
Figure 6:
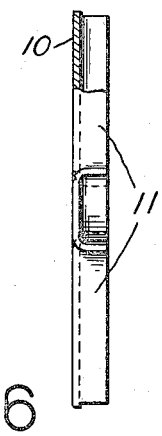

In practicing my invention, I have found that a piston following the conventional and approved shape is highly satisfactory in operation and far superior to pistons of a like form made of cast metal such as iron, or of aluminum or an aluminum alloy. I have illustrated a piston of the general type just referred to (Fig. 1) as the preferred embodiment of my invention, wherein the usual grooves or recesses indicated at 14 have been provided for the three compression rings and the groove 15 for the oil or bearing ring adjacent to the open or lower end of the piston. These grooves or recesses are formed in the bearing and reinforcing rings 16 and 17 fitted upon the exterior of the shell adjacent to the top and bottom thereof, as shown in Fig. 1, and which are of a metal softer than that of which the shell 7 is made.

These bearing and reinforcing rings 16 and 17, which are preferably made of cast iron or a ferrous metal, either of which lends itself admirably to the purposes of my invention,—are formed in the usual manner and of a size to fit snugly upon the outside of the piston shell 7. When positioned thereon, they may be temporarily retained in place pending the carrying out of the further steps incident to the production of my invention by any suitable means, such as by riveting or by spot welding or brazing.

Figure 7:
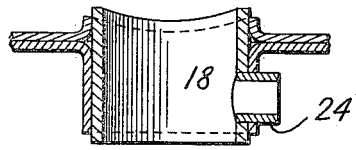
Figs. 7 and 8 are detail sectional views of forms of wrist pin bearings which may be used in the practicing of my invention.
Figure 8:
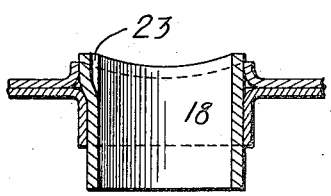

Following the positioning of the bearing and reinforcing rings, the wrist pin bearings which are in the form of sleeve sections, indicated at 18, are set into opposite sides of the piston shell or body, being preferably supported by collars 19 surrounding the inner portions of the bearing sleeves, and provided with outstanding flanges 20 united to the inner wall of the shell, as shown at 21, the outer ends of the bearings being supported by the outwardly flanged portion 22 of the shell. These parts, similarly to the other portions heretofore described, may be temporarily joined to the shell by spot welding or any suitable means. If desired, these wrist pin bearings may be in the form shown in Fig. 8 having a key groove 23 while another may be formed with a socket 24 for a set screw, as illustrated in Fig. 7 to be used in conjunction with connecting rods of different well known approved types.

It is obvious that in the construction or formation of a piston built up of several parts, and especially where certain of these parts are of metals of different characteristics, such as described, it is of the utmost importance that the various components be so united or joined together as to produce a substantially integral structure which will withstand the severe stresses and the high and variable temperatures to which the finished product will be subjected in use without impairing its efficiency through the separation of those components. To obtain this desired and necessary integral structure, I have found that the most efficient and economical method of effecting a permanent joinder of the piston parts is by immersing them in a brazing bath of spelter and flux which is maintained at a temperature slightly below the critical or melting point of the softer metal employed in the piston construction. The completely assembled piston, the components of which have been temporarily joined, as previously pointed out, is dipped or immersed in the molten brazing material which completely covers the piston and flows into the spaces between the several components, filling every niche or surface depression which may exist in the structures. The intense heat of the brazing bath results in a molecular union of the parts of like metal and a commingling of the molecules of the harder metal with those of the softer metal to a degree which in effect is virtually the same as that which would obtain in the union of the molecules of these two latter metals. In other words, an obsolutely complete fusion or joinder of the parts is obtained throughout their entire contacting areas. Manifestly, only a partial union of the contacting surfaces of the piston elements could result from the employment of surface brazing or any of the several forms of welding, whereas by the immersion method, the brazing material has free access to every part of the piston and a uniform and complete joinder of the entire areas of the contacting surfaces of the piston components is procured. The advantages of this solid or complete joinder over a partial joinder are obvious, particularly where the built up structure must withstand the severe strains imposed upon a piston when in use.

In the production of a piston in accordance with my invention as described, the piston body or shell is first pressed into form, after which the bearing and reinforcing rings are applied to the shell and the wrist pin bearings positioned in place. The structure is then immersed in the brazing bath, following which the outer cylindrical walls of the piston are ground to a true, smooth, cylindrical finish, and the wrist pin bearings reamed.

I have found by extensive experiments in both road and block tests of high speed engines, to which the trend is now general in the automotive art, that a piston formed of steel and iron in accordance with my invention gives highly satisfactory results, and is far superior to cast iron or aluminum or aluminum alloy pistons. The steel shell is light, while at the same time it possesses the strength necessary to resist the forces of combustion in the engine cylinder, and the cast iron or ferrous metal rings united to the shell, so as to be practically integral therewith, reinforce the same and give a bearing surface having a coefficient of expansion relatively to the cylinder walls to obtain the highest efficiency and effectually eliminate the possibility of the so-called "side slap" which is inherent to pistons constructed of metal other than cast iron. Furthermore, the use of cast iron or ferrous metal in the manner employed by me causes a great reduction in the wear or scoring of the cylinder walls by a reduction of vibration to a minimum.

Figure 10:
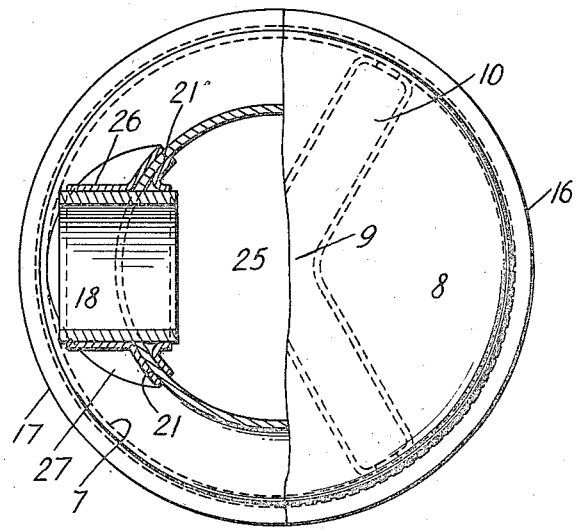
Figs. 9 and 10 are respectively a section elevation and a top plan view, partly in section, of a modified form of piston made in accordance with my invention.
Figure 9:
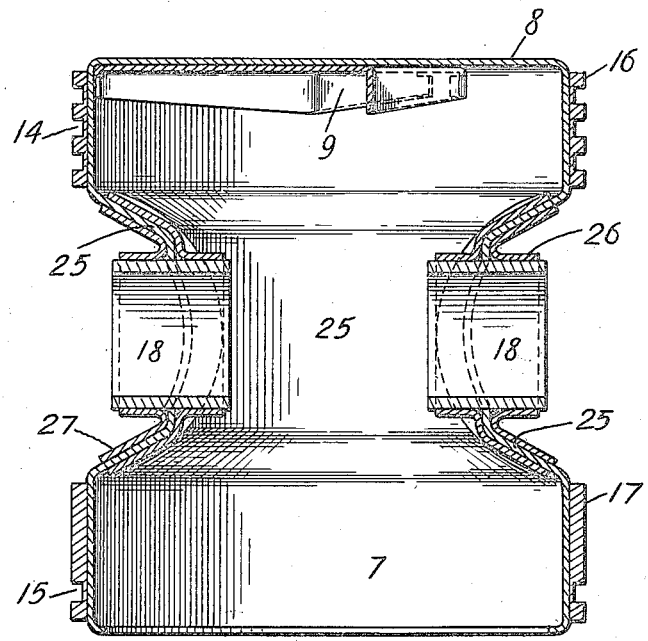

In the modified construction illustrated in Figs. 9 and 10 the wrist pin bearings are "inset," the sides of the shell being indented as indicated at 25, thus bringing the wall of the shell into engagement with the bearing sleeves about midlength the same. Furthermore, the bearing sleeves are reinforced by outside collars 26 having outstanding flanges 27 secured to the outer wall of the indented portions of the shell, the head of the piston being formed integral and braced by the three-armed spider 9. This form of my invention, similarly to that shown in Figs. 1 and 2 embodies outside bearing and the bearing and reinforcing rings 16 and 17 provided at both the top and bottom of the piston shell.

From the foregoing, it will be seen that, by my invention I have provided a piston of greater strength and much less weight than the cast iron pistons now in ordinary use and one possessing none of the disadvantages as to weakness, lack of wearing qualities and electrolytic action inherent to certain alloy pistons heretofore proposed as a substitute for cast iron pistons; also, that a piston constructed in accordance with my invention is capable of delivering more actual power, with less wear and vibration and makes for an engine of much greater flexibility and ability to "pick up" under load.

I claim:

1. An internal combustion engine piston comprising a relatively light body of pressed sheet metal, a separately formed pressed sheet metal member for reinforcing the head of the body and an annular ring of ferrous metal encircling the body, said ring being provided with a groove for a packing ring, all of the parts being permanently united by immersion in a bath of brazing material.

2. An internal combustion engine piston comprising a shell of pressed metal, wrist pin bearing sleeves set in opposite sides of the wall of said shell and united thereto by brazing, and a reinforcing ring of cast iron fitting upon the exterior of said shell and provided with piston ring grooves, said reinforcing ring being permanently united to said shell by immersion in a brazing bath.

3. An engine piston drawn up from a relatively light gauge blank of steel to form a shell of a true cylindrical configuration open at one end, the wall of said shell being provided with diametrically opposite openings, wrist pin bearings associated with said openings, and a bearing ring of a softer ferrous metal than the shell positioned upon the exterior thereof and permanently united thereto by means for effecting a complete joinder of the opposed surfaces of the shell and bearing ring to produce a unitary structure.

4. A piston for internal combustion engines comprising a shell drawn up from a relatively light gauge steel in a substantially cylindrical form and having an integral head portion, a member for reinforcing said head portion and the adjacent part of the wall of the piston, wrist pin bearings oppositely positioned in the wall of said piston, the portions of the piston wall surrounding said bearings being flanged outwardly to support the outer ends of said bearings, a collar to surround each of said bearings and provided with a flange shaped to conform with and engage the wall of the piston, said collars supporting the inner ends of said bearings, and cast iron reinforcing rings surrounding the wall of the piston adjacent to the top and bottom thereof, said reinforcing rings being grooved to receive packing rings, all of said components of the piston being united by dip brazing to form an integral structure.

5. A piston for internal combustion engines having a cylindrical shell with an integral head portion drawn up from relatively light gauge steel, the lower end of said shell being formed with an inturned flange, a reinforcement for the head and adjacent portion of the inner wall of said shell, diametrically opposite wrist pin bearings positioned in the wall of said shell, the outer ends thereof being supported by an outwardly extending flange integral with the shell wall, a collar for supporting the inner end of each of said bearings provided with a flange spaced from the periphery of the bearing and conformed to lie in surface contact with the inner wall of the shell, a cast iron reinforcing ring sized to fit upon the outer surface of the shell adjacent to the top thereof and provided with packing ring grooves, a cast iron reinforcing ring shaped to fit upon the outer surface of the shell contiguous to the lower end thereof, and provided with a packing ring groove, said reinforcement, said wrist pin bearings, the supporting collar therefor and said reinforcing rings, respectively, being united to said shell by dip brazing, whereby all of said parts will be united throughout their entire contacting areas to form in effect an integral structure.

6. A piston for internal combustion engines comprising a shell turned up from a relatively light gauge steel in a substantially cylindrical form and having a head portion, a member for reinforcing said head portion, and the adjacent part of the wall of the piston, oppositely disposed wrist pin bearings positioned in the wall of said piston, a collar surrounding each of said bearings and provided with a flange formed to engage the wall of the piston, said collars supporting the inner ends of said bearings, and cast iron reinforcing rings surrounding the wall of the piston adjacent to the top and bottom thereof, said reinforcing rings being grooved to receive packing rings, all of said components of the piston being united by dip brazing to form an integral structure.

7. A piston for internal combustion engines having a cylindrical shell with an integral head portion drawn up from relatively light gauge steel, a reinforcement for the head and adjacent portion of the inner wall of said shell, diametrically opposite wrist pin bearings positioned in the wall of said shell, the outer ends thereof being supported by the shell wall, a collar for supporting the inner end of each of said bearings provided with a flange spaced from the periphery of the bearing and conformed to lie in contact with the inner wall of the shell, a cast iron reinforcing ring sized to fit upon the outer surface of the shell adjacent to the top thereof and provided with packing ring grooves, a cast iron reinforcing ring shaped to fit upon the outer surface of the shell contiguous to the lower end thereof, and provided with a packing ring groove, said reinforcement, said wrist pin bearings, the supporting collar therefor and said reinforcing rings, respectively, being united to said shell by dip brazing, whereby all of said parts will be united throughout their entire contacting areas to form in effect an integral structure.

8. A piston for internal combustion engines consisting of a pressed metal shell having a separately formed cast iron bearing ring fitted upon the exterior thereof and united thereto by dip brazing.

9. An internal combustion engine piston consisting of a shell drawn up from a blank of relatively light gauge steel, said shell having diametrically opposite openings formed in the wall thereof, wrist pin bearings associated with said openings and supported from the interior of said shell, and a bearing ring of a ferrous metal of a lesser degree of hardness than that of the metal of the shell positioned upon and united to the exterior of the shell in a manner whereby a piston having the characteristics of an integral structure in resistivity to heat and stresses will be produced.

10. A piston for internal combustion engines embodying a shell formed of a metal having a relatively high melting point, bearing rings formed of a metal having a lower melting point than the shell metal mounted on the exterior of said shell and means for effecting a complete joinder of the shell and bearing ring, said means comprising a material which becomes molten at a point slightly below the critical point of the bearing ring metal and is adapted to effect a coalescence with the metals of the shell and bearing ring, whereby a unitary structure is produced.

WILBUR T. SOULIS.